United States Patent [19]

Clagett

[11] Patent Number: 5,723,923
[45] Date of Patent: Mar. 3, 1998

[54] APPARATUS FOR PROVIDING TORQUE AND FOR STORING MOMENTUM ENERGY

[75] Inventor: Charles E. Clagett, Accokeek, Md.

[73] Assignee: The United States of America as represented by the United States National Aeronautics and Space Administration, Washington, D.C.

[21] Appl. No.: 393,736

[22] Filed: Feb. 21, 1995

[51] Int. Cl.[6] .................................................. H02K 7/02
[52] U.S. Cl. .................. 310/74; 310/41; 310/76; 252/41; 252/54; 290/36
[58] Field of Search ........................ 310/74, 41, 76; 252/41, 54; 290/36; 70/52.1

[56] References Cited

U.S. PATENT DOCUMENTS

| | | | |
|---|---|---|---|
| 3,582,986 | 6/1971 | Yokoyama | 310/76 |
| 3,640,859 | 2/1972 | Messina et al. | 363/54 |
| 3,691,413 | 9/1972 | Russell | 310/41 |
| 3,819,966 | 6/1974 | Noguchi | 310/74 |
| 4,223,240 | 9/1980 | Theyse | 310/74 |
| 4,589,534 | 5/1986 | Apetrie et al. | 192/18 |
| 4,613,761 | 9/1986 | Yabunaka et al. | 290/36 R |
| 4,712,660 | 12/1987 | Erndt et al. | 192/18 |
| 4,879,054 | 11/1989 | Waynick | 252/41 |
| 5,390,554 | 2/1995 | Silvent | 74/5.12 |

*Primary Examiner*—Clinton LaBalle
*Assistant Examiner*—Elvin G. Enad
*Attorney, Agent, or Firm*—Keith L. Dixon

[57] ABSTRACT

A torque reaction/momentum wheel device for attitude control of a body, such as a spacecraft, having a motor driven flywheel with the flywheel at one end of a shaft and cantilevered with respect to at least two bearings which support the shaft which is common to the motor and flywheel, all having substantially the same spin axis. A housing which supports the motor and bearings is located all on one side of the flywheel which allows the flywheel to be balanced while mounted onto the shaft thus reducing dynamic unbalance forces. A cover is placed over the flywheel, motor, and housing so that the torque reaction/momentum wheel device can be pressurized which is necessary to prevent the bearing lubricant from migrating or evaporating out of the bearings. The bearings are lubricated by a grease which has low drag torque characteristics. This grease is a diester based oil with a lithium soap additive and filtered so that all particles are less than 10 microns in size. Because of the low drag torque, less power is required to rotate the flywheel to achieve a given level of torque or momentum storage.

17 Claims, 3 Drawing Sheets

Preferred Embodiment

Preferred Embodiment

ND FOR STORING MOMENTUM ENERGY

APPARATUS FOR PROVIDING TORQUE AND FOR STORING MOMENTUM ENERGY

ORIGIN OF THE INVENTION

This invention was made by an employee of the United States Government and may be used by or for the Government for governmental purposes without the payment of any royalties thereon or therefor.

FIELD OF THE INVENTION

This invention relates generally to devices for providing torque and for storing momentum energy and more particularly to flywheel type torque reaction/momentum wheels.

DESCRIPTION OF THE PRIOR ART

Techniques of using flywheels to control the attitude of the structures to which they are mounted are well known and have been used extensively in various mechanisms including earth orbiting satellites. In such apparatus, a rotating member, referred to as a flywheel, is coupled to a shaft, such shaft passing through the flywheel and being supported by radial or angular contact ball bearings located on each side of the flywheel. The bearings are usually preloaded, either by the use of a spring biased against the inner or outer bearing rings or, in the case of angular contact ball bearings, by clamping across the inner or outer bearing rings. The bearings are supported by a housing which is coupled to the framework of the satellite. The bearings are lubricated by either grease or oil.

The shaft is usually coupled to an electric motor which is, in turn, coupled to the housing. The motor receives input power from a power source external to the momentum wheel system.

Coupled to the housing and encapsulating, inter alia, the flywheel, bearings, shaft and motor is a thin cover. A power receptacle passes through either the thin cover or the housing and is coupled to the motor by wires through which power is supplied to the motor. The cover allows the apparatus to be pressurized which is necessary to prevent migration and evaporation of the bearing lubricant out of the bearings and into space.

When the motor receives input power, the output shaft rotates, and since coupled to the flywheel, the flywheel also rotates. The rotating flywheel stores momentum and when accelerated or decelerated, creates a resultant torque. An equal and opposite reaction torque is created on the satellite which causes the satellite to change attitude. Thus, by employing three or more torque reaction/momentum wheels with spin axes in at least three directions and controlling the magnitude of the torque produces by each flywheel, the satellite can be manuevered in space to change attitude and aim its instruments, which usually collect or sense scientific or meteorologic data, at various targets.

It is desirable for a torque reaction/momentum wheel device of a given size to produce as much torque and momentum storage as possible. The higher the torque output from the torque reaction/momentum wheel device, the faster a satellite of a given size and weight can be manuevered because the torque is transferred to the satellite causing it to change attitude. Fast reaction time is advantageous because, while manuevering, the satellite is not useful because the scientific instruments are not aimed at the desired target from which data is to be collected.

Typically, the flywheel is rotated at a base speed of approximately 200 revolutions per minute. Therefore, it is desirable to minimize dynamic unbalance forces in any of the rotating parts because any dynamic unbalance forces are transmitted to the satellite causing the satellite and its scientific instruments to vibrate. This reduces the clarity of the input signal received by the satellite's scientific instruments and, in turn, causes noise in whatever output signal the scientific instruments transmit to earth. The dynamic unbalance forces also add to the load carried by the bearings, thus reducing bearing life.

Known prior art type torque reaction/momentum wheel devices typically have the flywheel coupled to the shaft between at least two bearings. To minimize imbalances, the flywheel is balanced while detached from the rest of the system, and later mounted onto the shaft, during the assembly of the torque reaction/momentum wheel device. Thus, only the flywheel is balanced and any imbalances in the bearings, shaft and motor remain. These remaining imbalances cause noise in the torque reaction/momentum wheel device which results in noise in the satellite output signal.

The location of the bearings on each side of the flywheel necessitates that the housing provide structural support to the bearings on each side of the flywheel. This obstructs access to the flywheel and forces the flywheel to be balanced while detached from the rest of the system. The housing, being required to support the bearings on both sides of the flywheel, also forces the overall size of the torque reaction/momentum wheel device to be increased because the thin cover which encapsulates the system must clear the housing which supports the bearings. The weight of the torque reaction/momentum wheel device is increased, as well, due to the bulk of the housing.

It is desirable to keep the size and weight of the satellite and, therefore, of the torque reaction/momentum wheel device at a minimum. The less a satellite weighs, the less cost and effort is needed to place it into orbit and thus a lighter satellite can be placed into a higher orbit which increases orbital lifetime for the energy expended. Also, once in orbit, a lighter satellite can be manuevered more quickly. Because the weight of the torque reaction/momentum wheel system is included in the overall weight of the satellite, any weight reduction in the torque reaction/momentum wheel device impacts the torque required to maneuver the satellite as a whole.

Known prior art type torque reaction/momentum wheel devices typically have some amount of drag torque inherent within the system, primarily due to internal bearing friction. Magnetic forces within the motor also add to the drag torque. As a consequence, an added amount of power is needed in order to overcome the drag torque to cause the flywheel, shaft and bearings to rotate at a particular rate of speed. The bearing friction is primarily affected by the number of bearings used, the type of lubricant used, and the amount of bearing preload.

It is desirable to minimize the drag torque as much as possible in order to reduce the amount of power that is needed to achieve a particular rate of speed or acceleration. This is desirable because less power causes less heat to be generated and heat is a significant contributing cause of the failure of various torque reaction/momentum wheel device parts such as the bearings, the sensors which determine motor speed and position, and the motor itself. Also, it is desirable for the motor to require as little power as possible. The spacecraft power system can utilize a smaller battery and smaller solar array which cost less to procure and less to launch because of the reduced weight.

To reduce the drag torque, most prior art systems utilize oil lubricated bearings. Oil being the preferred lubricant because, due to its low viscosity, it is thought to produce less internal bearing friction when the bearings are rotated. Oil lubrication usually requires that extra components, such as oil reservoirs, channels and seals, be added to the torque reaction/momentum wheel device. These components add to the size, cost and complexity of the overall system. Pressurization of the torque reaction/momentum wheel device is required to prevent the oil from migrating and evaporating out of the bearings.

Some prior art devices use duplex pairs of angular contact bearings with relatively high preloads. In these systems there are typically four bearings in total which increases the drag torque, as does the high level of preload.

The torque reaction/momentum wheel device is very often the first device in the satellite to fail which results in the satellite becoming useless. Therefore, increases in the useful life of the torque reaction/momentum wheel device are critical to prolonging the useful life of a satellite.

SUMMARY

It is an object of the invention, therefore, to provide an improvement in torque reaction/momentum wheel devices.

It is a further object of the invention to provide an improvement in torque reaction/momentum wheel devices for controlling the attitude of a spacecraft such as a satellite.

It is yet a further object of the invention to provide a torque reaction/momentum wheel device which enables the overall satellite to have a faster response time to maneuver commands.

It is yet a further object of the invention to provide a torque reaction/momentum wheel device which causes less vibrations in the satellite and therefore less noise in the satellite output signal.

It is still another object of the invention to provide a torque reaction/momentum wheel device which has improved access to the flywheel while mounted onto the shaft.

It is yet a further object of the invention to provide a torque reaction/momentum wheel device which has reduced drag torque.

It is still a further object of the invention to provide a torque reaction/momentum wheel device which is reduced in power, weight and takes up less space than conventional torque reaction/momentum wheel devices without performance reduction.

Briefly, the foregoing objects and advantages are realized by a momentum wheel device which has a flywheel cantilevered at one end of a shaft with two bearings on one side of the flywheel such that the need for housing superstructure on one side of the flywheel is eliminated which allows the device to be balanced with the flywheel mounted on the shaft, and further utilizing a diester type grease as the bearing lubricant so as to achieve the lowest possible friction losses in the bearings.

BRIEF DESCRIPTION OF THE DRAWINGS

The following detailed description of the invention will be more readily understood when considered together with the accompanying drawings wherein.

DETAILED DESCRIPTION OF THE INVENTION

Figure 1:
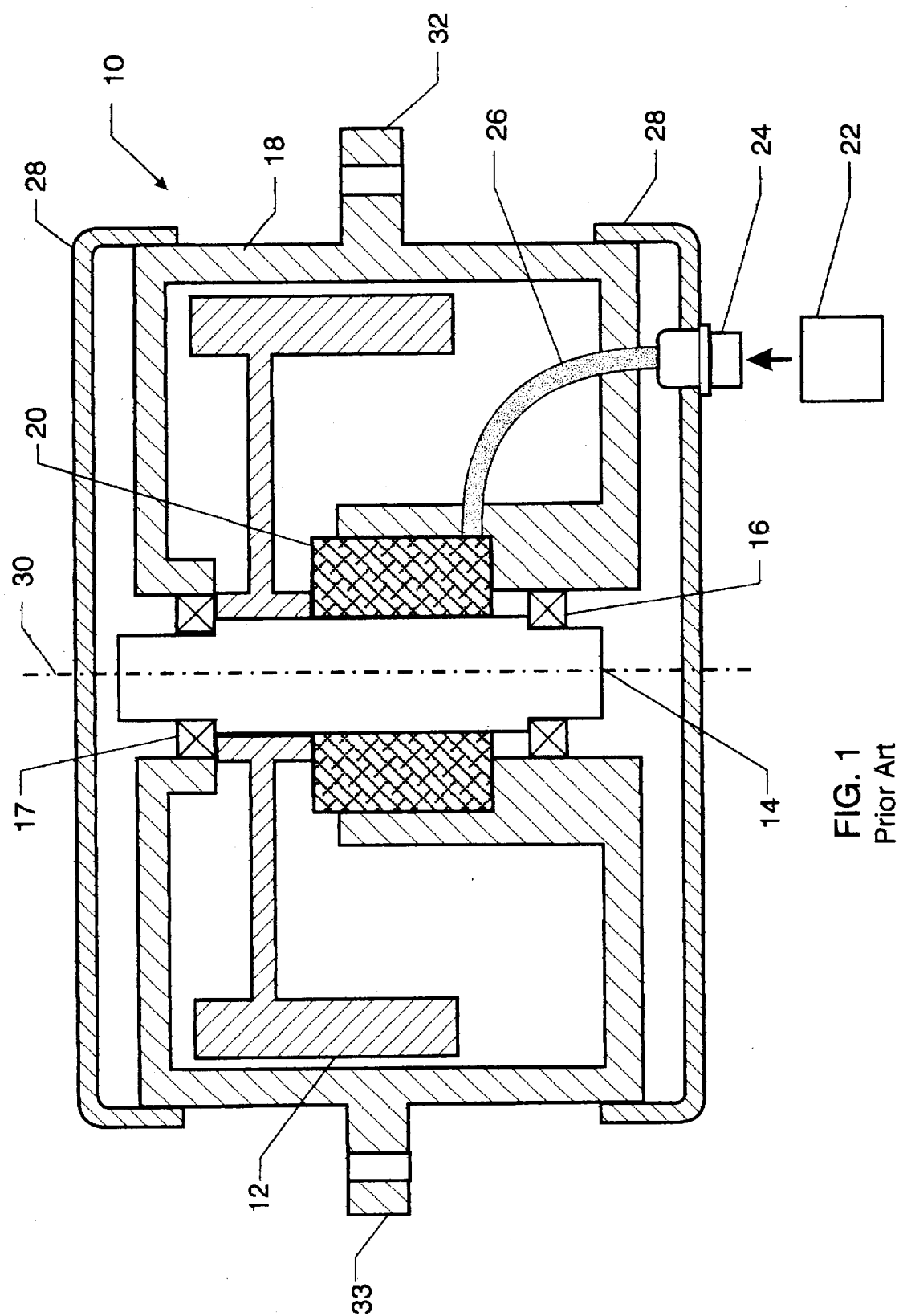
FIG. 1 is a cross sectional view of a typical known prior art device.

Referring now to the figures wherein like reference numerals refer to like parts throughout, reference will first be made to FIG. 1 which is illustrative of a conventional torque reaction/momentum wheel device generally illustrated by numeral 10. A flywheel 12 is coupled to a shaft 14 which is supported by bearings 16 and 17 located on either side of flywheel 12 and also being coupled to shaft 14 and a housing 18. A motor 20 causes shaft 14, bearings 16 and 17, and flywheel 12 to rotate when supplied with power from an external power source 22. External power source 22 is coupled to a hermetic connector 24 which transfers power through wires 26 to motor 20. A thin cover 28 encapsulates, inter alia, flywheel 12, shaft 14, bearings 16 and 17, part of housing 18, motor 20, and wires 26. Hermetic connector 24 passes through thin cover 28. Flywheel 12, shaft 14, bearings 16 and 17, housing 18, motor 20, and thin cover 28 are all substantially concentric with each other about a common axis 30.

In typical prior art embodiments, such as illustrated generally in FIG. 1, flywheel 12 is balanced before being coupled to shaft 14 in order to reduce the dynamic unbalance forces which are inherently present due to manufacturing imperfections which make it impossible to produce a body that is truly symmetrical about a spin axis. Separate balancing of flywheel 12 is necessary because housing 18 obstructs access to flywheel 12 when device 10 is assembled.

Housing 18, which supports bearings 16 and 17 on both sides of flywheel 12, adds to the weight of torque reaction/momentum wheel device 10. Typical known prior art devices have maximum torque to weight ratios ranging approximately from 0.370 ounce-inches/pound to 1.540 ounce-inches/pound. The higher this ratio is, the better, because a high ratio indicates that a relatively large torque capability is contained within a relatively light weight device.

In operation, electric current (not shown) is provided by power source 22, through hermetic connector 24 and wires 26 to motor 20. This causes motor 20 to rotate shaft 14, flywheel 12, and bearings 16 and 17 at angular speed $\omega$.

Assuming a frictionless system, the rotation of these members at angular speed $\omega$ creates momentum storage H, given by the equation $H=I\omega$, where I is the inertia of the rotating members which include flywheel 12, shaft 14, and bearings 16 and 17. Momentum storage H is the cross product of I by $\omega$ and can be modeled as a vector coincident with axis 30. The direction of rotation will determine the direction of the momentum storage vector along axis 30.

Again, assuming a frictionless system, when rotational speed $\omega$ is increased or decreased, angular acceleration $\alpha$, and torque t, given by equation $T=I\alpha$, result. Torque T is counteracted by an equal and opposite torque on a satellite (not shown) which is transmitted through flanges 32 and 33. Torque T is the cross product of I by $\alpha$ and also can be modeled as a vector coincident with axis 30. The direction of rotation and whether the flywheel is accelerating or decelarating determines the direction of the torque vector along axis 30.

In actuality, friction is present and a drag torque, $T_d$, results. The drag torque is primarily a result of the friction which is internal to bearings 16 and 17 but magnetic forces within motor 20 also add to the drag torque. So, the overall system torque is shown by the equation $T=I\alpha-T_d$. When flywheel 12 spins at constant angular velocity $\omega$, motor 20 needs to supply enough power to overcome the drag torque which is continually resisting the rotation of flywheel 12. The power needed to rotate flywheel 12 at constant velocity ω is the steady state power and is given by the equation $P=T_d\omega$. Therefore, if the steady state power and angular velocity are known, the drag torque can be calculated. The drag torque of conventional momentum wheel systems typically range from 0.027 Newton-meters to 0.073 Newton-meters at their base speed angular velocities with steady state power.

Typical prior art devices have maximum torque to peak power ratios ranging approximately from 0.0008 Newton-meters/Watt to 0.0012 Newton-meters/Watt. The higher this ratio, the better, because a high maximum torque to peak power ratio indicates that a relatively large torque capability can be achieved with relatively little power.

Figure 2:
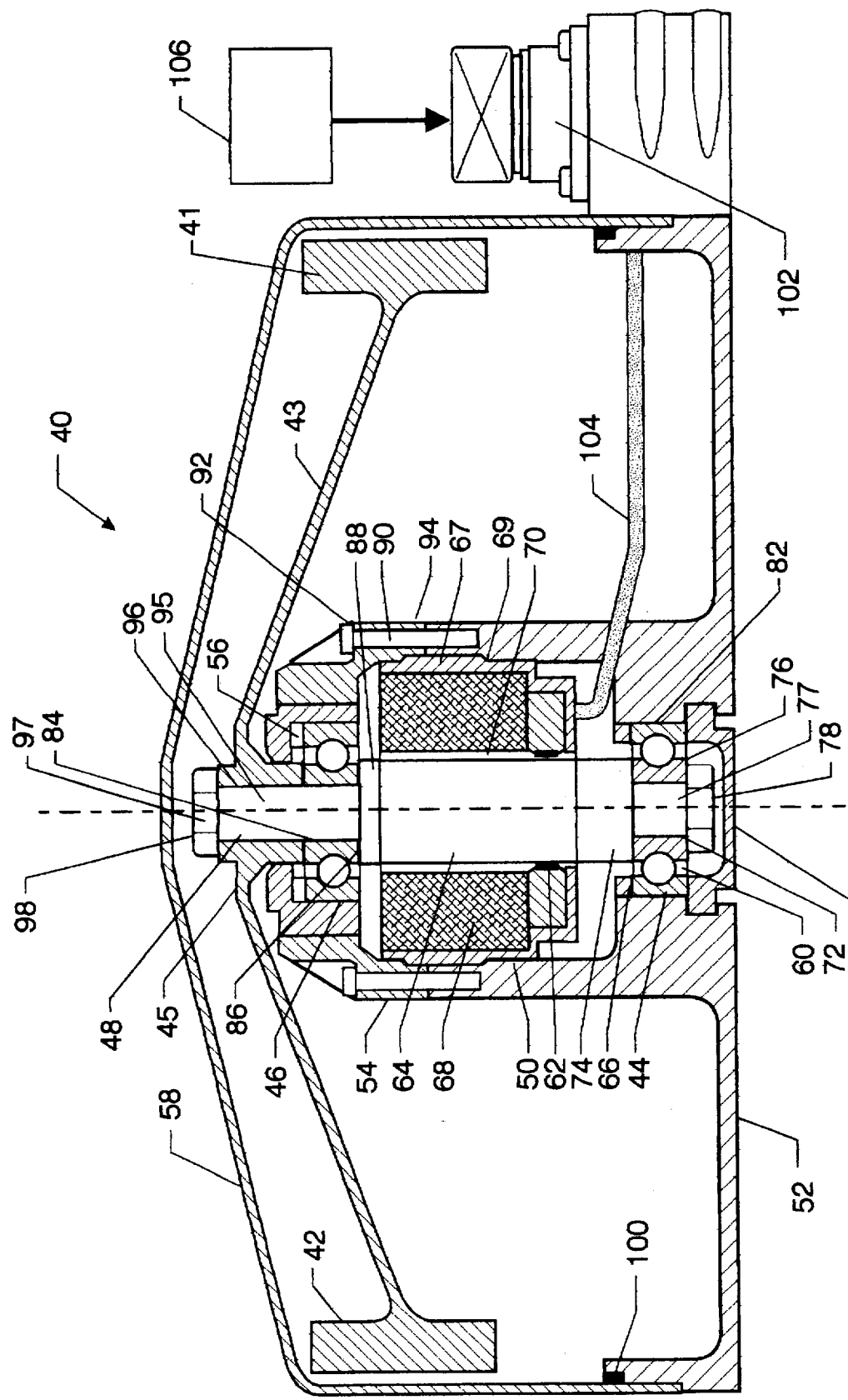
FIG. 2 is a cross sectional view of the preferred embodiment of the subject invention.

Directing attention now to the preferred embodiment of the subject invention, FIG. 2 is illustrative of an improved torque reaction/momentum wheel device generally illustrated by numeral 40 where a flywheel 42 including a circular rim 41, a conical web 43, and a hub 45 is in a cantilevered arrangement with respect to a lower bearing 44 and an upper bearing 46, and is coupled to a shaft 48 which is, in turn, coupled to a motor 50. Motor 50, lower bearing 44, and upper bearing 46 are supported by a housing 52 and a housing cap 54. Upper bearing 46 and lower bearing 44 are preloaded by a biasing member, preferably a spring 56. However, other biasing methods could be used such as using a duplex pairs of angular contact bearings (not shown) and clamping across either the inner or outer rings (not shown) of the duplex bearing pairs (not shown). A thin cover 58 encapsulates flywheel 42, shaft 48, lower bearing 44, upper bearing 46, motor 50, spring 56, housing cap 54, and part of housing 52, which allows the torque reaction/momentum wheel device 40 to be pressurized so that a bearing lubricant 60 does not migrate or evaporate out of lower bearing 44 and upper bearing 46 and into space.

Flywheel 42 is preferably made of a high density material such as steel, titanium, or brass, as are the shaft 48, lower bearing 44, and upper bearing 46. Motor 50 is preferably a brushless D.C. motor with Hall effect sensors 62 for sensing the speed and location of a rotor 64 which, in the preferred embodiment, is integral with shaft 48. Housing 52 and housing cap 54 are preferably made of a high strength material such as steel, titanium, or aluminum, and thin cover 58, which has less cross sectional thickness than housing 52, is also made of a high strength material such as steel, aluminum, or titanuium.

In torque reaction/momentum wheel device 40 as shown in FIG. 2, lower bearing 44, which is farthest from flywheel 42, is supported by housing 52 and is in contact with a lower housing shoulder 66. An outer portion 67 of motor 50, which contains windings 68 and Hall effect sensors 62 is supported by housing 52 and is in contact with a middle housing shoulder 69. Shaft 48 passes through a motor bore 70 and through a lower bearing bore 72 such that rotor 64, which is integral with shaft 48, substantially is surrounded by motor windings 68, and such that a lower shaft shoulder 74 is in contact with lower bearing inner ring 76. A relatively small portion 77 of shaft 48 protrudes past lower bearing 44 on the side opposite of where lower shaft shoulder 74 contacts lower bearing 44. The protruding portion 77 of shaft 48 is threaded and a lower nut 78 clamps lower bearing inner ring 76 against lower shaft shoulder 74. The majority of shaft 48 protrudes through motor 50 and past housing 52. A lower plug 80 seals a hole 82 in housing 52 in which lower bearing 44 is located.

Upper bearing 46 is supported by housing cap 54 and contacts spring 56. Upper bearing 46 supports shaft 48 which protrudes from motor 50, and shaft 48 passes through an upper bearing bore 84. An upper bearing inner ring 86 contacts an upper shaft shoulder 88. A plurality of bolts 90 pass through a plurality of housing cap holes 92 spaced equidistant around the perimeter of housing cap 54 and into a plurality of corresponding housing holes 94 in housing 52. Housing holes 94 are threaded, as are bolts 90, and housing cap 54 is securely tightened to housing 52.

Flywheel 42 is mounted to a portion 95 of shaft 48 which protrudes from upper bearing 46 and housing cap 54. The protruding portion 95 of shaft 48 passes through the flywheel hub 45. A small portion 97 of shaft 48 protrudes past flywheel 42 and this portion 97 of shaft 48 is threaded. An upper nut 98 clamps flywheel 42 and upper bearing inner ring 86 to upper shaft shoulder 88.

Thin cover 58 passes over flywheel 42 and the other components and couples to housing 52 thus encapsulating torque reaction/momentum wheel device 40. An O-ring 100 is located between housing 52 and thin cover 58 and seals torque reaction/momentum wheel device 40 so that it can be pressurized.

A hermetic power receptacle 102 is coupled to and passes through housing 52. Wires 104 are coupled inside torque reaction/momentum wheel device 40 between motor 50 and hermetic power receptacle 102. When torque reaction/momentum wheel device 40 is attached to a satellite (not shown) by bolting it to the frame (not shown) of the satellite (not shown), an external power source 106 is coupled to hermetic power receptacle 102.

This preferred embodiment has many advantages over the known prior art. As illustrated in FIG. 2, the components which require support by housing 52 and housing cap 54 are all located on the same side of flywheel 42 and flywheel 42 is located substantially at one end of shaft 48. In this arrangement, before thin cover 58 is placed over torque reaction/momentum wheel device 40, flywheel 42 can be balanced while assembled onto shaft 48 because housing 52 and housing cap 54 do not obstruct the access to flywheel 42. This decreases the imbalance of torque reaction/momentum wheel device 40 compared to known prior art devices. As a result of improved balance, the vibrations transmitted from torque reaction/momentum wheel device 40 to the satellite are reduced and, in turn, less noise in the satellite output signal results.

Because housing 52 and housing cap 54, which provide support for upper bearing 46 and lower bearing 44, are located to only one side of flywheel 42, less overall housing 52 is needed. This allows the size and weight of torque reaction/momentum wheel device 40 to be less than known prior art devices of equivalent torque and momentum storage capability. This improves the response time of a satellite of a given size because the satellite as a whole weighs less. The preferred embodiment, depicted essentially in FIG. 2, has a maximum torque to weight ratio of approximately 2.30 ounce-inches/pound. This is more than a 50 percent increase over the best known prior art device.

The type of bearing lubricant 60 used in the invention results in a number of improvements over known prior art devices. Bearing lubricant 60 was selected by testing many different lubricants. Several factors, including operating temperature range, lubricant migration, particle size, and most importantly, drag torque were evaluated in the selection process. Surprisingly, the best bearing lubricant was a type of grease. This result is contrary to intuition that oil, being less viscous, produces less internal bearing friction than grease.

The grease selected is a diester based oil with a lithium soap additive and filtered such that all particles are less than 10 microns. The operating temperature range is substantially −54° C. to 121° C. (−65° F. to 250° F.). The viscosity of the grease at 100° C. is substantially 3.38 centistokes, at 38° C. is substantially 12.70 centistokes, and at −54° C. is substantially 81.50 centistokes. This grease conforms to military specification MIL-G-81937. One grease which meets these criteria is "Minapure Grease" which is manufactured by William F. Nye, Inc.

As a result of the low drag torque associated with selected bearing lubricant 60, less power is needed to rotate flywheel 42. The preferred embodiment has a drag torque of approximately 0.015 Newton-meters at its base speed angular velocity with steady state power and has a maximum torque to power ratio of approximately 0.0031 Newton-meters/Watt, which is more than a 140 percent increase over the best known prior art device.

The low drag torque characteristic of bearing lubricant 60 results in less heat being generated which improves the useful life of torque reaction/momentum wheel device 40. Because grease is used, extra components such as oil reservoirs, channels, and seals, which many prior art devices utilize, are not needed. This allows the cost of torque reaction/momentum wheel device 40 to be reduced because less components and manufacturing steps are required.

It should be noted that it is possible to have any number of variations of the scheme shown in FIG. 2. For example, flywheel 42 in FIG. 2 is conical in shape which allows for a reduced thin cover 58 profile. However, the shape of flywheel 42 could be that of a disk. Also, flywheel 42 could be any number of sizes which would allow torque reaction/momentum wheel system 40 to be tailor made to varying torque and momentum storage requirements, simply by changing flywheel 42.

Figure 3:
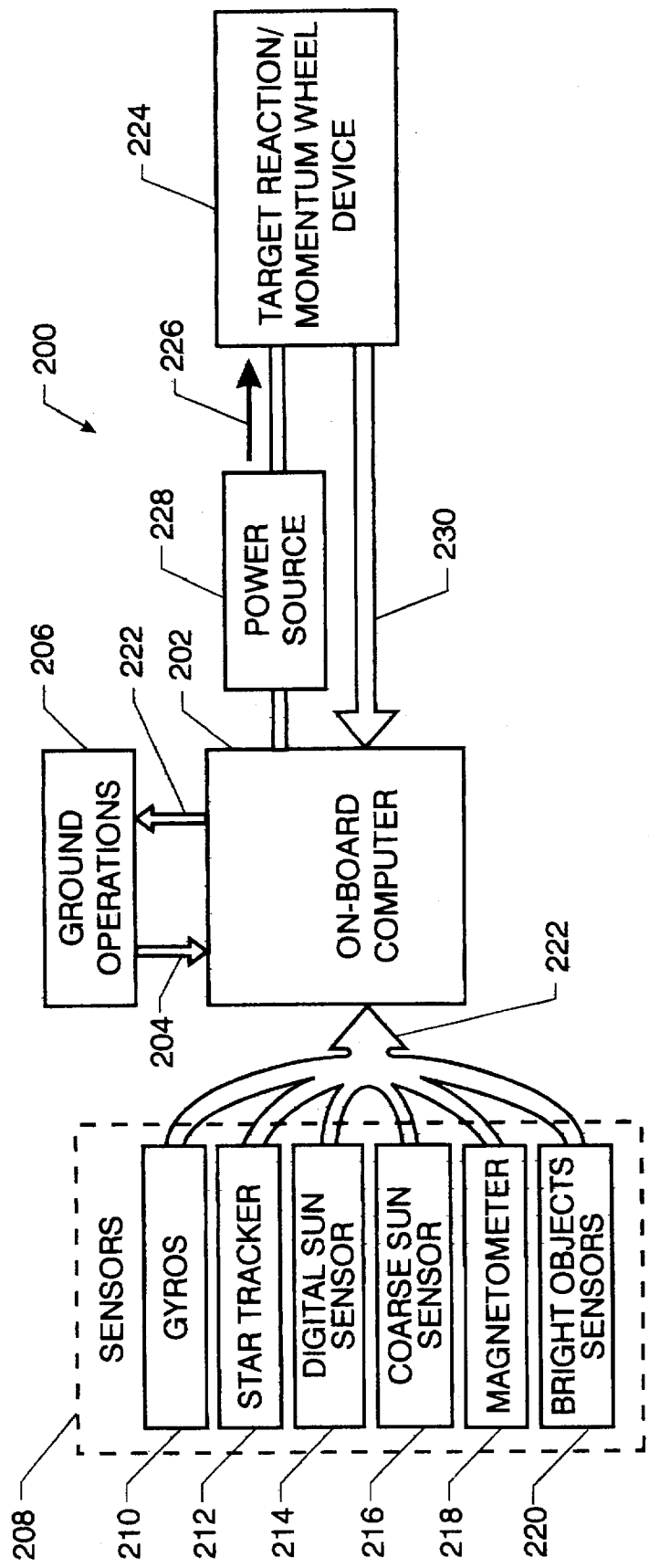
FIG. 3 is a block diagram of a satellite attitude feedback control system.

The torque reaction/momentum wheel device shown generally in FIG. 2 is used as an attitude control component in a feedback control system which is generally depicted in FIG. 3 as numeral 200. The structure that is to have its attitude controlled (not shown) such as a satellite (not shown) has an onboard computer 202 which receives input commands 204 from ground operations 206 to change the attitude of the satellite (not shown) in order to aim the satellite's scientific instruments (not shown) at a desired target (not shown). A number of sensors 208, which include gyroscopes 210, star trackers 212, digital sun sensors 214, coarse sun sensors 216, magnetometers 218, and bright object sensors 220 feed data 222 to onboard computer 202 to indicate the position and attitude of the satellite (not shown). Data 222 is also transmitted from the satellite to ground operations 206.

When onboard computer 202 receives input commands 204 to change attitude, onboard computer 202 calculates an amount of torque (not shown) required of each torque reaction/momentum wheel device 224 to execute the commanded maneuver. Onboard computer 202 also calculates an amount of electric current 226 that is required by motor 50 of FIG. 2 to rotate rotor 64, shaft 48, upper bearing 46, lower bearing 44, and flywheel 42, all of FIG. 2, at the appropriate acceleration α, to create the proper torque (not shown) as calculated by onboard computer 202. The proper amount of current 226 is then supplied by external power source 228 to motor 50 of FIG. 2 through hermetic connector 102 of FIG. 2 and wires 104 of FIG. 2. Hall effect sensors 62 of FIG. 2 sense the speed of rotation and acceleration of rotor 64 of FIG. 2 and this information 230 is fed back to onboard computer 202.

As the structure (not shown) such as a satellite (not shown) changes attitude, onboard computer 202 continually updates the torque (not shown) and current 226 required to complete the command and once the structure (not shown) reaches the desired attitude, external power supply 228 continues to supply the required steady state power (not shown) through hermetic connector 102 of FIG. 2 and wires 104 of FIG. 2 to motor 50 of FIG. 2 which causes rotor 64, shaft 48, upper bearing 46, lower bearing 44, and flywheel 42, all of FIG. 2, to rotate at the desired base speed angular velocity.

Having thus shown and described what is at present considered to be the preferred embodiment of the invention, it should be noted that the same has been made by way of illustration and not limitation. Accordingly, all alterations, modifications, and changes coming within the spirit and scope of the invention are herein meant to be included.

I claim:

1. A torque reaction/momentum wheel device comprising:

support means located only on one side of said device;

a cantilevered flywheel for storing angular momentum;

motor means integrally formed with said support means;

shaft means coupled with said motor means and said cantilevered flywheel;

bearing means rotatably coupled with said shaft; and cover means coupled with said support, means via an o-ring seal so as to encapsulate and pressurize said cantilevered flywheel, said support means and said motor means.

2. The torque reaction/momentum wheel device of claim 1 wherein said flywheel is generally conical in shape and including a concave side facing said motor means.

3. The torque reaction/momentum wheel device of claim 2 wherein said flywheel includes an annular rim, a hub, and a conical web interconnecting said rim and said hub.

4. The torque reaction/momentum wheel device of claim 2 wherein said bearing means for supporting said shaft includes two substantially antifriction bearings coupled to opposite end portions of said shaft and wherein said cantilevered flywheel is attached to said shaft exteriorally of one of said bearings.

5. The torque reaction/momentum wheel device of claim 4 wherein said substantially antifriction bearings comprise ball bearing assemblies.

6. The torque reaction/momentum wheel device of claim 5 wherein said ball bearing assemblies are preloaded.

7. The torque reaction/momentum wheel device of claim 6 wherein said ball bearing assemblies are preloaded by bias springs.

8. The torque reaction/momentum wheel device of claim 4 wherein each of said ball bearing assemblies includes a means for lubricating said ball bearing assemblies.

9. The torque reaction/momentum wheel device of claim 8 wherein said means for lubricating comprises a grease.

10. The torque reaction/momentum wheel device of claim 9 wherein said grease comprises a diester based oil type grease.

11. The torque reaction/momentum wheel device of claim 10 wherein said grease includes a lithium soap additive.

12. The torque reaction/momentum wheel device of claim 10 wherein said grease is filtered so as to only contain particles less than 10 microns, has an operating temperature range from about −54± C. to about 121° C., has a viscosity of about 3.38 centistokes at abut 100° C., has a viscosity of about 12.70 centistokes at about 38° C., and has a viscosity of about 81.50 centistokes at about −43° C.

13. The torque reaction/momentum wheel device of claim 2 wherein said motor means comprises an electric motor.

14. The torque reaction/momentum wheel system of claim 1 wherein said cover means hermetically encapsulates and flywheel and said motor means, and wherein said motor means comprises an electric motor including wires coupling said electric motor to a hermetically sealed power receptacle, said hermetically sealed power receptacle being coupleable to an external power source.

15. The torque reaction/momentum wheel device of claim 14 wherein said electric motor comprises a brushless DC motor.

16. The torque reaction/momentum wheel device of claim 15 wherein said brushless DC motor includes Hall effect sensors for sensing the speed of said motor and the location of a rotor of said motor.

17. The torque reaction/momentum wheel device of claim 15 wherein said brushless DC motor includes a rotor which is integral with said shaft.

* * * * *